H. Hays,
Boring Wood.

No. 24,633.            Patented July 5, 1859.

Witnesses:
Thos. Geo. Harold
Chas. A. Smith

Inventor:
Henry Hays.

UNITED STATES PATENT OFFICE.

HENRY HAYS, OF NEW YORK, N. Y.

MACHINE FOR BORING.

Specification of Letters Patent No. 24,633, dated July 5, 1859.

*To all whom it may concern:*

Be it known that I, HENRY HAYS, of the city, county, and State of New York, have invented, made, and applied to use a certain new and useful Improvement in Machinery for Boring Dowel-Holes in Barrel-Heads; and I do hereby declare that the following is a full, clear, and exact description of the construction and operation of the same, reference being had to the annexed drawing, making part of this specification, wherein—

Figure 2:
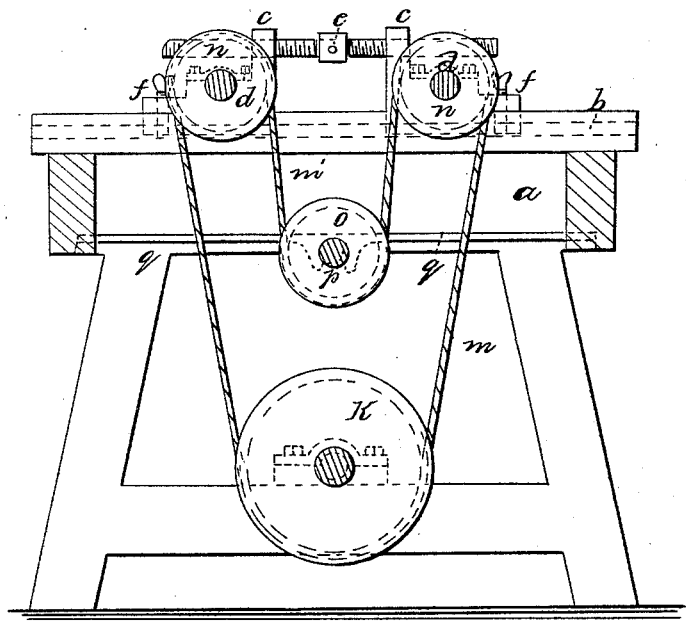
Figure 1:
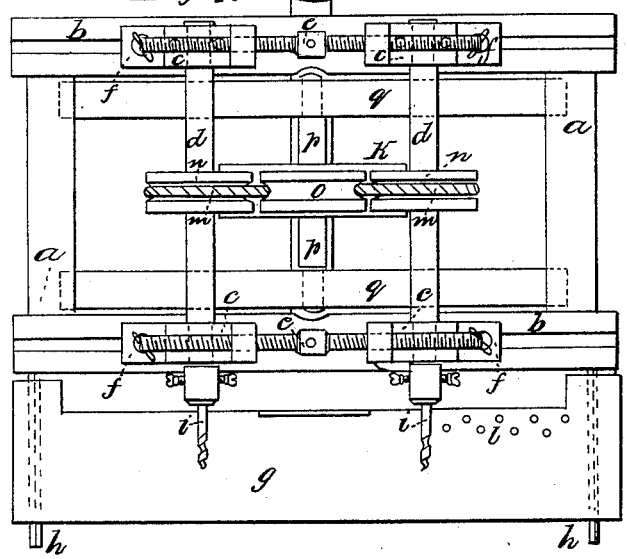

Figure 1, is a plan of said machine and Fig. 2 is a vertical longitudinal section.

Similar marks of reference denote the same parts.

In making heads for barrels and casks it is usual to bore holes on opposite sides of the meeting edges and insert a wooden dowel.

My present invention relates to an arrangement of machinery for performing this well known operation, which has heretofore been done by different machinery from mine, as well as by hand in the old method.

In the drawing $a$, $a$, are frames of wood or suitable material on the top of which V slides or grooves $b$, $b$, are provided, receiving the head blocks $c$, $c$, $c$, $c$, that take the cross shafts $d$, $d$, by journal boxes on said head blocks; these head blocks are kept apart by means of double screws $e$, $e$, passing with right and left hand threads through the boxes $c$, $c$, as the respective pairs stand on the slides $b$, $b$, and $f$ $f$ are clamping screws one or more to each head $c$, to act against the slide $b$, and hold the head in place; on the outer ends of the shafts $d$, $d$, boring tools $i$, $i$, are provided, and $g$ is a bed on slides $h$, onto which the material is laid and the end brought to a gaged position by a pin inserted in either of the holes $l$. It will now be seen that the boring tools $i$, $i$, and their shafts or spindles $d$, $d$, can be adjusted any width apart that may be desired and so retained by the screws $e$, $e$, and $f$ $f$, and in order to revolve the shafts $d$, $d$, and their tools, I provide a main pulley $k$, driven by competent power from which a belt or band $m$, passes over pulleys $n$, $n$, on said spindles $d$, $d$, and beneath the spring tightening pulley $o$, on a shaft $p$, the ends of which run in journals on the springs $q$, $q$, that are fitted into recesses in the crosspieces of the main frame $a$. It will now be apparent that the arrangement of the pulleys $k$, $n$, $n$, and $o$, insures a firm hold of the band $m$, on the pulleys $n$, $n$, and also allows for the adjustment of the spindles $d$ $d$, and their boring bits to any distance the dowel holes may be required apart, because the springs $q$, $q$, yield with any change of tension on the belt $m$ and avoid the necessity of lengthening or shortening said belt.

I do not claim boring dowel holes by machinery; neither do I claim a tightening pulley to a belt; but

What I claim as my invention and desire to secure by Letters Patent is—

The arrangement of the adjustable head blocks $c$, carrying the spindle $d$, of the boring tools, when combined with the spring tightening pulley $o$, in the manner and for the purposes specified.

In witness whereof I have hereunto set my signature this fourth day of June 1859.

HENRY HAYS.

Witnesses:
  THOS. GEO. HAROLD,
  LEMUEL W. SERRELL.